United States Patent
Rindoks et al.

(10) Patent No.: US 9,833,778 B2
(45) Date of Patent: Dec. 5, 2017

(54) LABORATORY WORK CABINET WITH FILTER MOUNTING MECHANISM

(71) Applicant: Kewaunee Scientific Corporation, Statesville, NC (US)

(72) Inventors: Kurt P. Rindoks, Statesville, NC (US); Jeremy Miller, Statesville, NC (US)

(73) Assignee: Kewaunee Scientific Corporation, Statesville, NC (US)

( * ) Notice: Subject to any disclaimer, the term of this patent is extended or adjusted under 35 U.S.C. 154(b) by 99 days.

(21) Appl. No.: 14/931,233

(22) Filed: Nov. 3, 2015

(65) Prior Publication Data

US 2017/0120233 A1    May 4, 2017

(51) Int. Cl.
*B01L 1/00*    (2006.01)
*B01D 46/00*    (2006.01)

(52) U.S. Cl.
CPC ............ *B01L 1/00* (2013.01); *B01D 46/0005* (2013.01); *B01D 46/0019* (2013.01); *B01L 2200/025* (2013.01); *B01L 2300/0681* (2013.01)

(58) Field of Classification Search
CPC ........ B01D 39/00; B01D 46/46; B01D 50/00; B01D 29/06; B01D 46/00; F16L 37/20
USPC ...... 55/385.2, 493, 481, 490, 484, 313, 422; 285/311, 420; 277/101
See application file for complete search history.

(56) References Cited

U.S. PATENT DOCUMENTS

| | | | |
|---|---|---|---|
| 4,098,174 A | 7/1978 | Landy | |
| 4,100,847 A | 7/1978 | Norton | |
| 4,124,361 A * | 11/1978 | Revell | B01D 46/0098 285/311 |
| 4,548,627 A * | 10/1985 | Landy | B08B 15/023 454/188 |
| 4,698,078 A * | 10/1987 | Mavros | B01D 46/10 55/313 |
| 5,915,439 A * | 6/1999 | Zaiser | B01D 41/04 15/304 |
| 6,368,206 B1 | 4/2002 | Hunter et al. | |
| RE40,276 E | 4/2008 | Hunter et al. | |
| 7,364,602 B2 * | 4/2008 | Wu | B01D 46/0005 200/61.51 |

(Continued)

*Primary Examiner* — Duane Smith
*Assistant Examiner* — Minh-Chau Pham
(74) *Attorney, Agent, or Firm* — Nelson Mullins Riley & Scarborough LLP (57) ABSTRACT

An improved filter mounting mechanism for laboratory work cabinets, especially biological safety cabinets, enables simple and quick removal and replacement of a filter supported in the cabinet housing between a work chamber and a filtration chamber. The filter mounting mechanism includes a stationary filter support surface between the work chamber and the filtration chamber, and a filter clamping surface movable toward and away from the filter support surface between a clamping position relatively proximal to the filter support surface for holding the filter in an operational disposition against the filter support surface and an installation position relatively distal to the filter support surface for permitting insertion and removal of the filter between the filter support and clamping surfaces. An extensible and retractable linkage mechanism, e.g., a scissors mechanism, is connected to the filter clamping surface for selectively actuating movement of the clamping surface between the clamping and installation positions.

12 Claims, 5 Drawing Sheets

(56) References Cited

U.S. PATENT DOCUMENTS

| | | | |
|---|---|---|---|
| 2007/0074495 A1* | 4/2007 | Morgan | B01D 46/008 55/478 |
| 2008/0278042 A1 | 11/2008 | McCarthy et al. | |
| 2011/0244775 A1 | 10/2011 | Haugen et al. | |
| 2011/0281514 A1 | 11/2011 | Haugen et al. | |
| 2015/0345438 A1* | 12/2015 | Finn | F02M 35/02416 55/480 |

* cited by examiner

LABORATORY WORK CABINET WITH FILTER MOUNTING MECHANISM

BACKGROUND OF THE INVENTION

The present invention relates generally to laboratory work cabinets such as exhaust hoods, fume hoods, and biological safety cabinets and, more particularly, to means for the mounting, installation and removal of contaminant filters in such cabinets.

Various forms of work cabinets are commonly utilized in laboratories in many diverse industries ranging from educational and research institutions to chemical, medical and pharmaceutical concerns. Such cabinets may include, for example, fume hoods, other exhaust hoods, and biological safety cabinets. While such cabinets may differ in varying structural and operational respects, the common purpose and use of such cabinets is to provide scientists and associated personnel with access to a work chamber for performing various scientific tests, reactions, experiments and like operations while protecting the operator and the ambient laboratory environment from exposure to potentially dangerous contaminants.

All such cabinets necessarily include an air circulation system for controlling airflow within the cabinet and for filtering contaminants from the airflow. In turn, all such cabinets have the periodic need to replace air filters as they become loaded with accumulated filtered materials. In some cabinets, the removal and replacement of contaminant laden filters can be a time consuming process involving extended downtime in the normal operation of the cabinets. In biological safety cabinets which provide a biohazard containment means which enables laboratory personnel to perform various procedures utilizing biologically hazardous substances while protecting the personnel, the work product and the ambient environment from exposure to and contamination by such substances, that issue is particularly prevalent because such cabinets typically include two filters requiring periodic replacement, one for filtering air recirculating within the cabinet and another for filtering air being exhausted from the cabinet, and because each of the filters must be installed with highly secure seals to protect against the dangerous biologically hazardous substances typically being handled.

Thus, while the present invention is applicable to the mounting, installation, removal and replacement of filters in virtually any laboratory work cabinet, the present invention is particularly applicable to biological safety cabinets. For example, one class of biological safety cabinet referred to as Class II, Type A2 cabinets basically have a work chamber that is mostly enclosed except for a front access opening sufficient for a user's hands to perform procedures within the work chamber. An air circulation system maintains a continuously circulating positive air flow within the work chamber which is controlled to move laminarly in parallel relation to the front access opening to prevent escape of the internal cabinet air outwardly through the forward access opening to protect the user and the ambient area from contamination. The air circulation system utilizes a fan to continuously withdraw air from the work chamber into an adjacent filtration chamber from which a portion of the air is recirculated into the work chamber through a first high efficiency particulate air filter, commonly referred to as a HEPA filter, while the balance of the withdrawn air is exhausted outside the cabinet through a second HEPA filter. Typically, a ratio of about 70% recirculated air to 30% exhausted air is maintained in Class II A2 cabinets. The exhausted air is replaced by ambient air from the surrounding room drawn first into the filtration chamber before entering the work chamber through the first filter, thereby to prevent room air contamination of the work chamber and also to maintain the integrity of the laminar air flow along the front access opening.

It is important that the full perimeter of each filter in such biological safety cabinets be securely sealed to prevent any portion of the recirculating or exhausting airstreams from bypassing the filters and thereby contaminating either the work chamber or the exhausted air with biological materials. It is equally important that the filters in such biological safety cabinets be replaced with sufficient frequency to maintain uniformity in the laminar velocity of the circulating air and to minimize airborne contaminants in the circulating air. In turn, therefore, it is desirable that downtime in operation of the cabinets be minimized when accomplishing filter replacement but that objective is outweighed by the necessity that filters be installed precisely with secure perimeter seals. Hence, there is a continuing need in the industry for a simple and quick yet reliable means of removing and replacing filters in such cabinets.

SUMMARY OF THE INVENTION

The present invention seeks to address the foregoing needs of the industry by providing an improved means for the mounting, installation and removal of contaminant filters in laboratory work cabinets, but especially in biological safety cabinets.

Briefly summarized, the present invention provides a novel filter mounting mechanism which can be adapted to essentially any laboratory work cabinet having a housing defining a work chamber and a filtration chamber, a filter between the filtration chamber and the work chamber for removing contaminants from air passing between the work chamber and the filtration chamber, and an air circulation system for directing air flow between the work chamber and the filtration chamber and through the filter. According to the invention, the filter mounting mechanism comprises a stationary filter support surface disposed between the work chamber and the filtration chamber, and a filter clamping surface movable toward and away from the filter support surface. More particularly, the filter clamping surface is movable between a clamping position relatively proximal to the filter support surface for holding the filter in an operational disposition against the filter support surface and an installation position relatively distal to the filter support surface for permitting insertion and removal of the filter between the filter support and clamping surfaces. An extensible and retractable linkage mechanism is connected to the filter clamping surface for selectively actuating movement of the clamping surface between the clamping and installation positions.

In a contemplated embodiment, the linkage mechanism is a pantograph linkage, such as a scissors linkage which may comprise, for example, pivoted scissors links connected by a common drive rod for moving the scissors links in coordinated extending and retracting movements relative to one another.

As mentioned, the invention may be advantageously embodied in a biological safety cabinet wherein the air circulation system includes a fan interposed between the work chamber and the filtration chamber for drawing air under negative pressure from the work chamber and directing the air under positive pressure into the filtration chamber and therefrom through the filter for return into the work chamber for recirculating air between the work and filtration chambers.

In such an embodiment, the biological safety cabinet may further comprise a second filter between the filtration chamber and an exhaust opening in the housing for exhausting a portion of the pressurized air delivered by the fan to outside the housing and a second filter mounting mechanism may be provided for such filter.

For example, a second stationary filter support surface may be provided adjacent the exhaust opening, with a second filter clamping surface movable toward and away from the second filter support surface between a second clamping position relatively proximal to the second filter support surface for holding the second filter in an operational disposition against the second filter support surface and a second installation position relatively distal to the second filter support surface for permitting insertion and removal of the second filter between the second filter support and clamping surfaces. A second extensible and retractable linkage mechanism is connected to the second filter clamping surface for selectively actuating movement of the second clamping surface between the second clamping and installation positions.

The second linkage mechanism may also be a scissors linkage or other pantograph linkage, for example, also having pivoted scissors links connected by a common drive rod for moving the scissors links in coordinated extending and retracting movements relative to one another.

The filtration chamber may be defined by first and second plenum sections which are movable relative to one another, with the first plenum section including the first-mentioned filter clamping surface and the second plenum section including the second filter clamping surface.

Additional features and characteristics of the present invention will be described in and apparent from the following disclosure of a contemplated embodiment, with reference to the accompanying drawings.

DETAILED DESCRIPTION OF THE PREFERRED EMBODIMENTS

Figure 1:
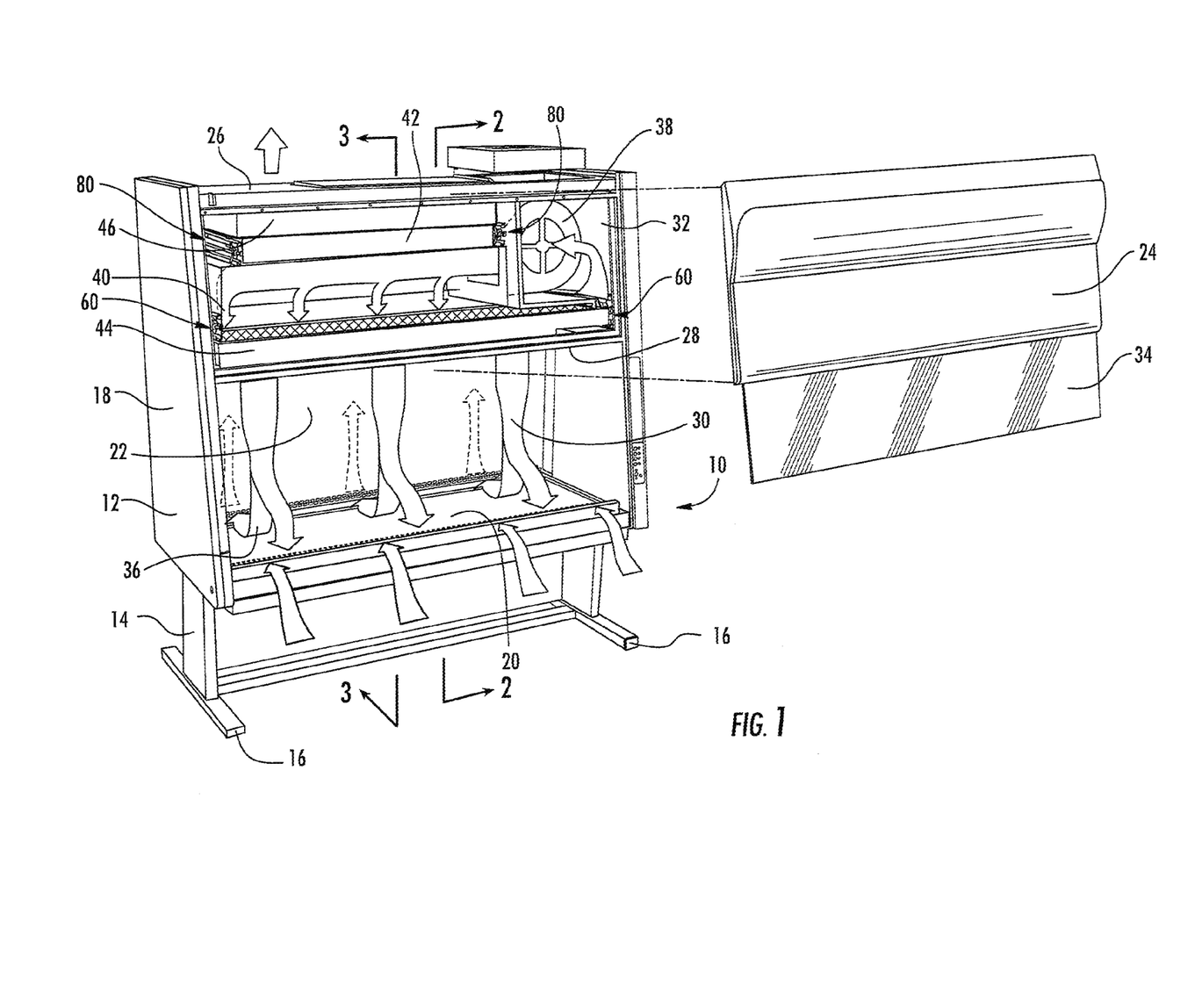
FIG. 1 is a partially exploded and partially broken-away perspective view of a biological safety cabinet according to a contemplated embodiment of the present invention.

Referring now to the accompanying drawings, and initially to FIG. 1, a biological safety cabinet in accordance with one contemplated embodiment of the present invention is indicated generally at 10. The safety cabinet 10 basically comprises a housing 12 supported on a trestle stand 14, which may include a set of casters (not shown) for moveability of the cabinet structure. The housing 12 is a generally rectangular structure having spaced-apart end walls 18, a bottom wall 20, a rear wall 22, a partial front wall 24, and a top wall 26, collectively defining an open interior which is divided by a horizontal intermediate wall 28 into a lower work chamber 30 and an upper air recirculation chamber 32. The housing 12 may preferably be fabricated of sheet metal, such as stainless steel.

The partial front wall 24 predominately encloses only the air recirculation chamber 32, leaving open front access by users into the work chamber 30. A transparent sash 34 is supported by and extends downwardly from the front wall 24 to partially enclose the work chamber 30 except for a narrow front access opening 36 into the work chamber 30 between the bottom wall 20 and the lower edge of the sash 34 through which users may have manual access into the work chamber 30. The transparency of the sash 34 permits visual access into the work chamber 30 by users. The sash 34 may also be retractable as necessary to permit greater access into the work chamber 30 by users.

Figure 3:
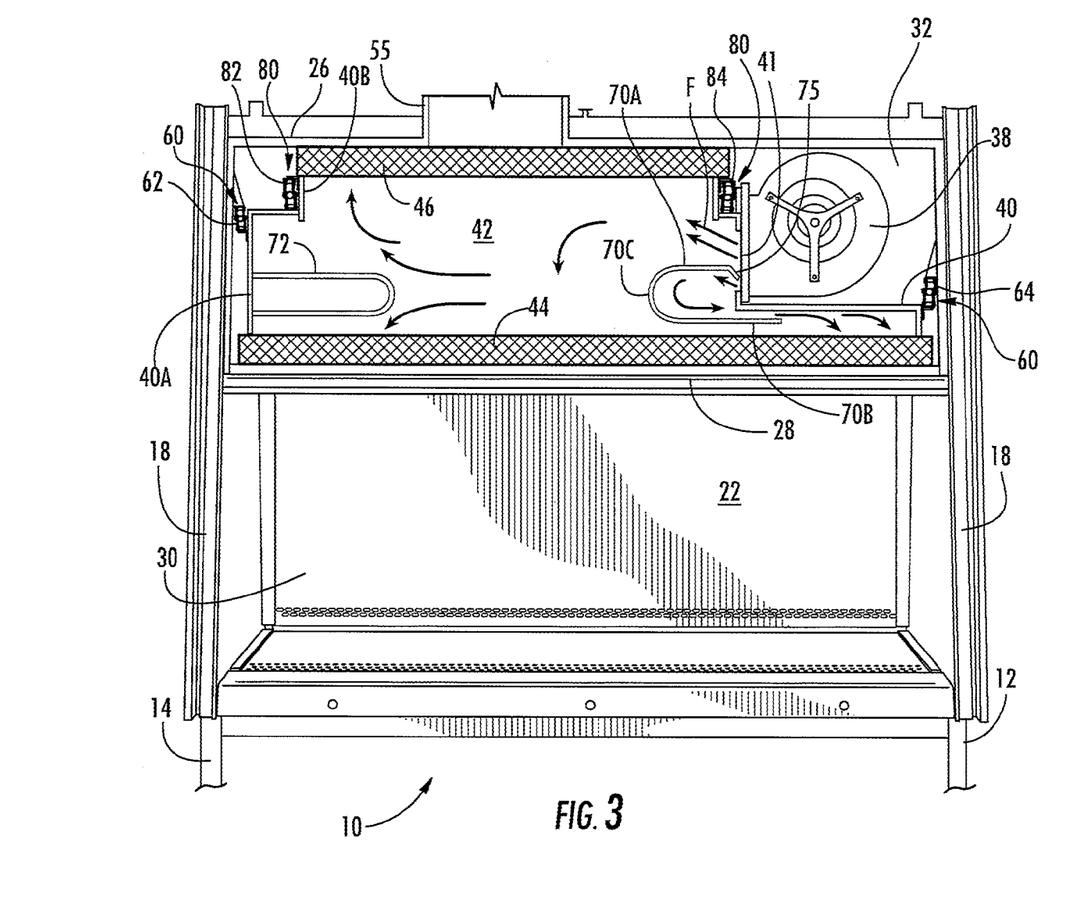
FIG. 3 is another vertical cross-sectional view of the biological safety cabinet of FIG. 1, taken along line 3-3 thereof.
Figure 4:
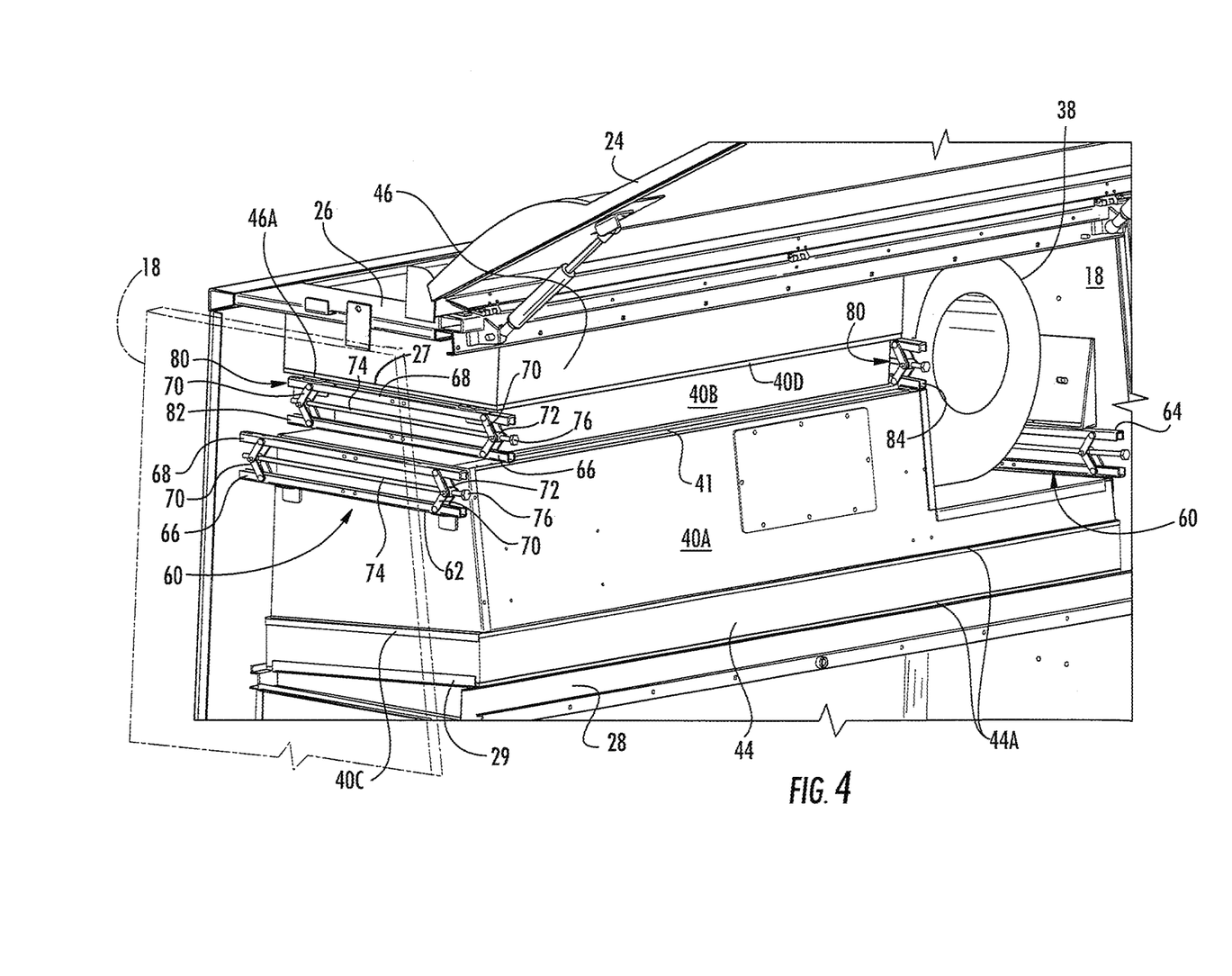
FIG. 4 is a partially exploded and partially broken-away perspective view of the air recirculation chamber of the biological safety cabinet of FIG. 1, depicting each filter mounting mechanism in its clamping condition holding the filters in their operational dispositions.
Figure 5:
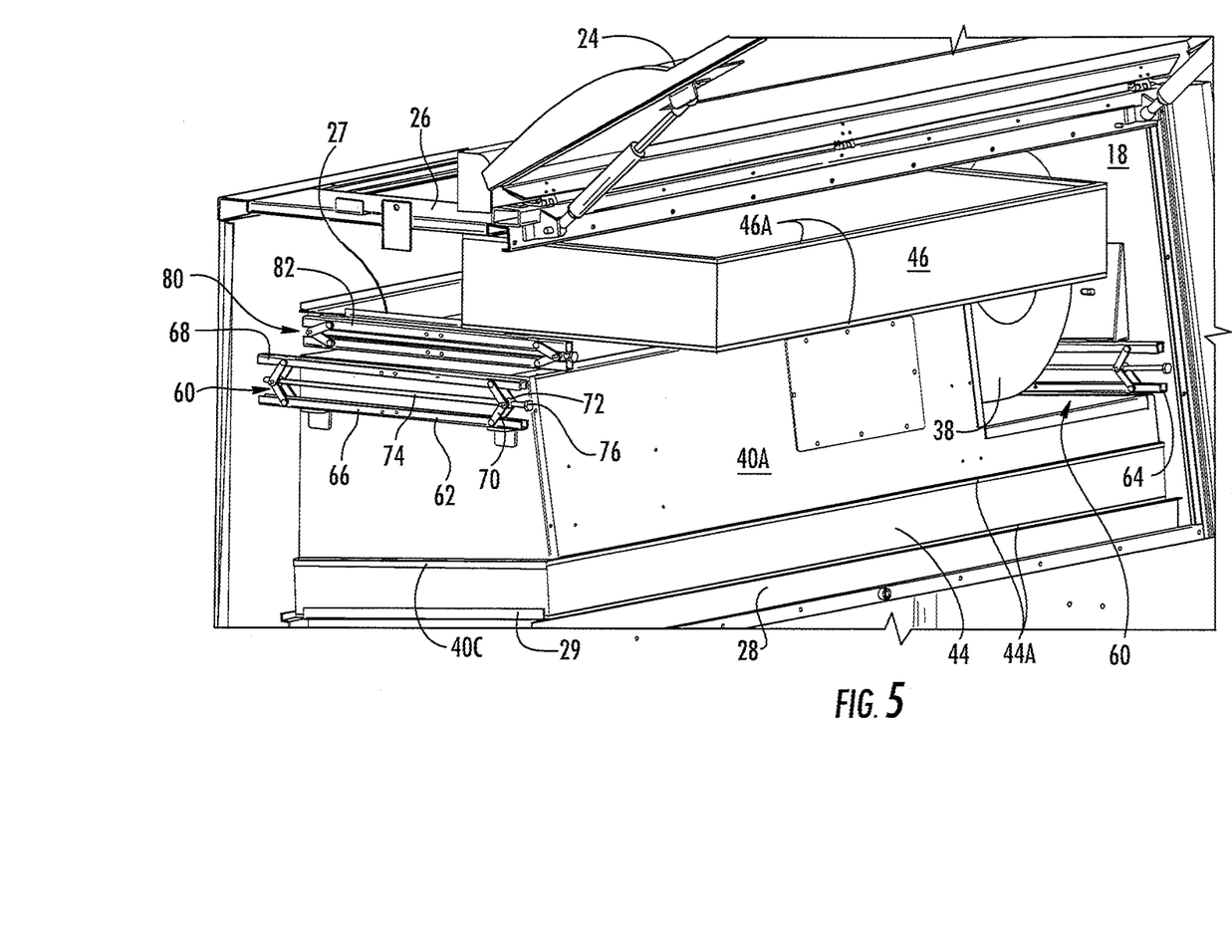
FIG. 5 is a partially exploded and broken-away perspective view similar to FIG. 4, depicting the upper filter mounting mechanism in its installation condition for removal and installation of a replacement filter.

In FIG. 1, the front wall 24 is shown in exploded relation to the remainder of the cabinet 10 for illustration of the air recirculation chamber 32, but as seen in FIGS. 4 and 5 the front wall 24 is preferably mounted by hinges to the top wall 26 for upward pivoting when access to the recirculation chamber 32 is necessary or desirable. As shown in FIG. 1 and further seen in FIGS. 2-5, the majority of the air recirculation chamber 32 is occupied by a hollow sub-housing 40 defining a plenum within its open interior which serves as an air filtration chamber 42. The sub-housing 40 is formed collectively by a lower plenum section 40A and an upper plenum section 40B which telescopes slidably into the lower plenum section 40A. A seal 41 (FIG. 4) is mounted to the lower plenum section 40A in sealing contact around the entire telescoping surface of the upper plenum section 40B. An air circulation fan 38 is mounted within one end of the recirculation chamber 32 with the output side of the fan 38 mounted to one end of the lower plenum section 40A of the sub-housing 40 to discharge blown air under positive pressurize into the air filtration chamber 42.

The lowermost bottom side of the lower plenum section 40A of the sub-housing 40 is open and the intermediate wall 28 of the main housing 12 is formed with a corresponding opening for air flow communication therebetween. A first air filter 44 is disposed between the bottom side of the lower plenum section 40A and the intermediate main housing wall 28 in full covering relation to their respective openings. Similarly, the uppermost topside of the upper plenum section 40B of the sub-housing 40 is open in facing relation to and communication with an exhaust duct 55 in the top wall 26 of the main housing 12. A second air filter 46 is disposed between the topside of the upper plenum section 40B and the top main housing wall 26 in full covering relation to their respective openings. Each air filter 44, 46 includes seals 44A, 46A extending fully about their upper and lower perimeters for sealing engagement with the respective housing walls 26, 28 and plenum sections 40A, 40B. The two air filters 44, 46 are preferably high efficiency particulate air filters, more commonly referred to as HEPA filters, for their ability to capture molecular-sized microorganisms and like biological matter.

Figure 2:
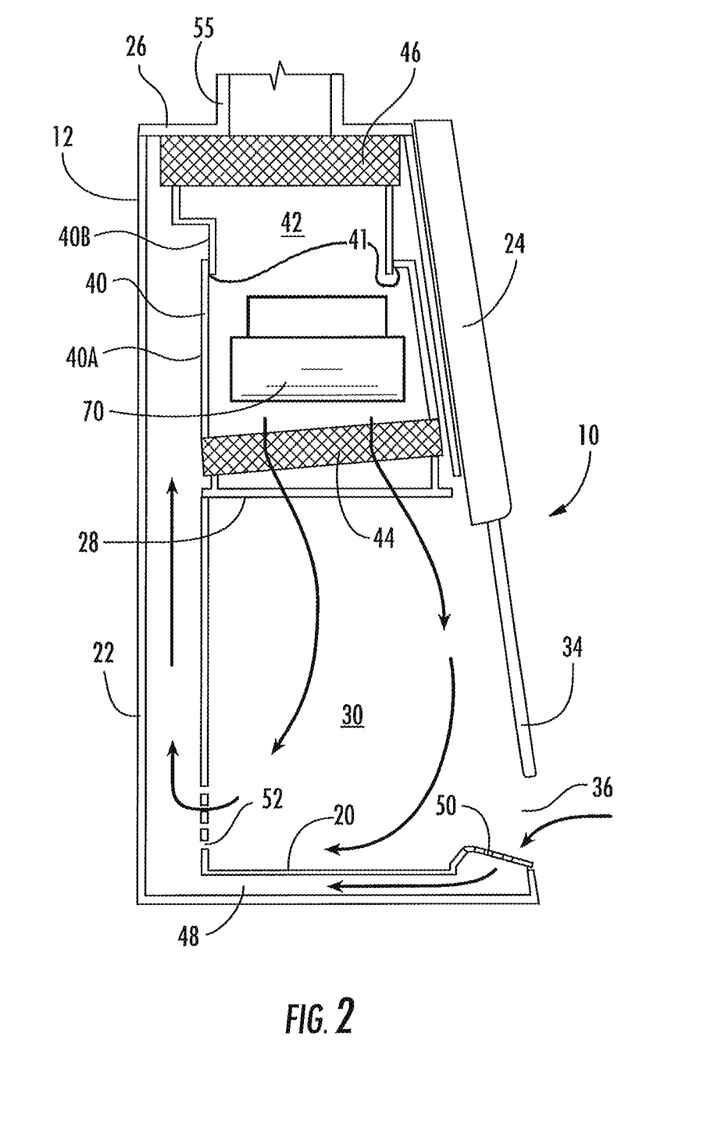
FIG. 2 is a vertical cross-sectional view of the biological safety cabinet of FIG. 1, taken along line 2-2 thereof.

The intake side of the fan 38 draws air from within the work chamber 30 and also from the ambient air surrounding the safety cabinet 10 through hollow interior channels defined within the bottom and rear walls 20, 22 of the housing 12. More specifically, as best seen in FIG. 2, each of the bottom and rear walls 20, 22 are formed by dual spaced wall panels defining a continuous interior airflow channel 48 within the bottom wall 20 and continuing upwardly within the rear wall 22 to open into the air recirculation chamber 32. A series of perforations 50 are formed along substantially the full length of the forward edge of the bottom wall 20 to open into the forwardmost end of the airflow channel 48. A similar series of perforations 52 are formed along the lowermost end of the rear wall 22 adjacent its juncture with the bottom wall 20, also opening into the airflow channel 48 thereat.

The housing 12 of the safety cabinet 10 will thus be understood to provide a controlled air recirculation system which operates as follows. The fan 38 continuously creates a negative pressure condition within its end of the air recirculation chamber 32 which acts through the airflow channel 48 to draw air from within the work chamber 30 through the perforations 52 and into the airflow channel 48. To a somewhat lesser extent, surrounding ambient air is drawn into the airflow channel 48 through the perforations 50. The fan 38 pressurizes the in-drawn air and discharges it under positive pressure into the filtration chamber 42 from which a portion of the air passes downwardly through the filter 44 into the work chamber and a portion of the air passes upwardly through the filter 46 into the exhaust duct 55. The filter 44 is of a substantially larger size than the filter 46 such that the majority of the airflow, for example approximately 70%, returns into the work chamber 30 through the filter 44, with only a smaller proportion, for example approximately 30%, of the airflow being exhausted.

Within the work chamber 30, the air passing downwardly through the filter 44 moves predominantly vertically downwardly in a laminar manner which, together with the constraint of the sash 34, the constraint of incoming ambient air into the perforations 50, and the negative pressure exerted from the fan through the rearward perforations 52, substantially prevents the escape of any of the airflow outwardly through the access opening 36. Thus, users may perform laboratory procedures within the work chamber 30 utilizing hazardous substances, e.g., microorganisms, particulate toxic chemicals, etc., without risking escape of such substances into the ambient area outside the cabinet. Moreover, as such procedures are ongoing, the continuous recirculation of the air internally within the housing 12 progressively filters airborne contaminants so as to maintain sufficient cleanliness within the internal air to prevent contamination of the procedure.

As will be understood, the filters 44, 46 will progressively become loaded with filtered contaminants over time as the cabinet is operated whereby the filters must be replaced on a periodic basis. Conventionally, the filters are secured in place by a series of bolts, screws or other fasteners, that are difficult and time consuming to remove and reinstall, often requiring hours to accomplish. The present invention provides a uniquely simple and reliable means of removing loaded filters 44, 46 and installing new replacement filters with minimal downtime.

As depicted in FIGS. 3, 4, and 5, a first filter mounting mechanism, indicated generally at 60, for installing and supporting the lower filter 44 comprises a pair of extensible and retractable pantograph linkage mechanisms, for example in the form of a pair of scissors-jack mechanisms 62, 64, mounted within the recirculation chamber 32 to act between the lower plenum section 40A of the sub-housing 40 and the lower filter 44. Each scissors-jack mechanism 62, 64 comprises a pair of mounting bars 66, 68 supported in parallel spaced relation adjacent opposite ends by two pairs of pivoted scissors links 70. A threaded drive nut 72 is affixed to the pivot between each pair of scissors links 70 and a threaded drive rod 74 extends in threaded engagement through the drive nuts 72. The drive rod 74 has a hexagonal head 76 on its forward end for actuation of drive rotation via a common socket drive tool or wrench. The scissors jack mechanisms 62, 64 are mounted at opposite ends of the lower plenum section 40A, with each upper mounting bar 66 affixed to the inside face of a respective end wall 18 of the main housing 12 and with each lower mounting bar 68 affixed to the respective end of the lower plenum section 40A.

Similarly, a second filter mounting mechanism, indicated generally at 80, for installing and supporting the upper filter 46 comprises a pair of extensible and retractable pantograph linkage mechanisms in the form of identical scissors-jack mechanisms 82, 84, mounted within the recirculation chamber 32 to act between the upper plenum section 40B of the sub-housing 40 and the upper filter 46. The scissors jack mechanisms 82, 84 are mounted at opposite ends of the upper plenum section 40B, with each upper mounting bar 68 affixed to the adjacent end face of the upper plenum section 40B and with each lower mounting bar 66 affixed to the top face of the lower plenum section 40A.

Thus, the heads 76 of the respective drive rods 74 of the scissors-jack mechanisms 62, 64, 82, 84 are conveniently accessible to an operator or service technician upon lifting of the front wall 24 and sash 34. By selective clockwise or counterclockwise rotation of the drive rods 74, coordinated extending or retracting movements of the mounting bars 66, 68 are effected toward or away from one another so as to move either or both of the respective plenum sections 40A, 40B telescopically relative to one another. The scissors-jack mechanisms 62, 64, 82, 84 may include one or more guide elements (not shown), e.g., in the form of a plate or other link connecting the respective mounting bars 66, 68, to synchronize and guide their extending and retracting movements in a vertical direction and prevent any tendency for the mechanisms to undergo any horizontal or inclined vector of motion.

The upwardly facing surface of the intermediate wall 28 of the main housing 12 surrounding the opening in the wall 28 serves as a stationary support surface for the lower filter 44, and the downwardly facing perimeter edge 40C of the lower plenum section 40A serves as a filter clamping surface for exerting a clamping retention force on the filter 44 against the wall 28, as depicted in FIG. 4. The wall 28 is provided with spaced-apart flanges 29 for slidable insertion and positioning of the filter 44 on the wall 28 in proper alignment relative to the lower plenum section 40A. By simple rotational actuation of the respective drive rods 74 of the scissors-jack mechanisms 62, 64 to retract the mechanisms, the lower plenum section 40A may be elevated sufficiently from the intermediate wall 28 to permit the filter 44 to be quickly removed and replaced with a new filter 44 when necessary. Once the replacement filter 44 is properly positioned on the intermediate wall 28, reverse rotation of the drive rods 74 extends the scissors-jack mechanisms 62, 64 to lower the plenum section 40A into clamping engagement with the new filter 44, thereby effecting a secure seal along both the upper and lower perimeters of the filter 44.

Similarly, the downwardly facing surface of the top wall 26 of the main housing 12 surrounding the exhaust duct 55 serves as a stationary support surface for the upper filter 46, and the upwardly facing perimeter edge 40D of the upper plenum section 40B serves as a filter clamping surface for exerting a clamping retention force on the filter 46 against the wall 26, as depicted in FIG. 4. The wall 26 is likewise provided with spaced-apart flanges 27 for slidable insertion and positioning of the filter 46 between the wall 26 and the upper plenum section 40B in proper alignment relative thereto. By rotational actuation of the drive rods 74 of the scissors-jack mechanisms 82, 84 to retract the mechanisms, the upper plenum section 40B may be lowered sufficiently from the top wall 26 to permit the filter 46 to be quickly removed and replaced with a new filter 46 when necessary, for example as depicted in FIG. 5. Once the replacement filter 46 is properly positioned between the wall 26 and the upper plenum section 40B, reverse rotation of the drive rods 74 extends the scissors jack mechanisms 82, 84 to raise the upper plenum section 40B into clamping and sealing engagement with the new filter 46.

As will thus be readily understood, the filter mounting mechanisms 60, 80 of the present invention enable simple, easy and rapid removal and installation of filters with minimal downtime in laboratory work cabinets, and especially in biological safety cabinets having multiple filters in which heightened safety and security concerns mandate that the filters must be precisely secured and sealed in place. Whereas in conventional biological safety cabinets removal and replacement of filters can be difficult and take several hours, the exchange of filter in cabinets according to the present invention can be reduced to a matter of minutes with equal or even greater filter security.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A laboratory work cabinet comprising:
   (a) a housing defining a work chamber and a filtration chamber,
   (b) a filter between the filtration chamber and the work chamber for removing contaminants from air passing between the work chamber and the filtration chamber, the filter comprising a filter medium surrounded by a perimeter seal,
   (c) an air circulation system for directing air flow between the work chamber and the filtration chamber and through the filter in an air flow direction transversely to the filter medium, and
   (d) a filter mounting mechanism comprising:
      (i) a stationary filter support surface disposed between the work chamber and the filtration chamber,
      (ii) a filter clamping surface movable toward and away from the filter support surface between a clamping position relatively proximal to the filter support surface for holding the filter in an operational dis-
      position against the filter support surface and an installation position relatively distal to the filter support surface for permitting insertion and removal of the filter between the filter support and clamping surfaces, and
      (iii) an extensible and retractable linkage mechanism connected between the housing and the filter clamping surface outside of the work and filtration chambers for selectively actuating movement of the clamping surface between the clamping and installation positions in a linear direction parallel to and outside of the air flow.

2. A laboratory work cabinet according to claim 1, wherein the linkage mechanism is a pantograph linkage.

3. A laboratory work cabinet according to claim 2, wherein the linkage mechanism is a scissors linkage.

4. A laboratory work cabinet according to claim 3, wherein the scissors linkage comprises pivoted scissors links connected by a common drive rod for moving the scissors links in coordinated extending and retracting movements relative to one another.

5. A laboratory work cabinet according to claim 1, wherein the housing, filter and air circulation system are arranged for operation of the work cabinet as a biological safety cabinet.

6. A laboratory work cabinet according to claim 5, wherein the air circulation system includes a fan interposed between the work chamber and the filtration chamber for drawing air under negative pressure from the work chamber and directing the air under positive pressure into the filtration chamber and therefrom through the filter for return into the work chamber for recirculating air between the work and filtration chambers.

7. A laboratory work cabinet according to claim 6, further comprising a second filter between the filtration chamber and an exhaust opening in the housing for exhausting a portion of the pressurized air delivered by the fan to outside the housing.

8. A laboratory work cabinet according to claim 7, further comprising a second filter mounting mechanism comprising:
   (i) a second stationary filter support surface adjacent the exhaust opening,
   (ii) a second filter clamping surface movable toward and away from the second filter support surface between a second clamping position relatively proximal to the second filter support surface for holding the second filter in an operational disposition against the second filter support surface and a second installation position relatively distal to the second filter support surface for permitting insertion and removal of the second filter between the second filter support and clamping surfaces, and
   (iii) a second extensible and retractable linkage mechanism connected to the second filter clamping surface for selectively actuating movement of the second clamping surface between the second clamping and installation positions.

9. A laboratory work cabinet according to claim 8, wherein the second linkage mechanism is a pantograph linkage.

10. A laboratory work cabinet according to claim 9, wherein the second linkage mechanism is a second scissors linkage.

11. A laboratory work cabinet according to claim 10, wherein the second scissors linkage comprises pivoted scissors links connected by a common drive rod for moving the scissors links in coordinated extending and retracting movements relative to one another.

12. A laboratory work cabinet according to claim 8, further comprising first and second plenum sections defining the filtration chamber, the first and section plenum sections being movable relative to one another, the first plenum section including the first-mentioned filter clamping surface and the second plenum section including the second filter clamping surface.

* * * * *